J. A. ROBBINS.
Planing-Saw.

No. 211,259. Patented Jan. 7, 1879.

Witnesses:
H. S. Talbot
Edward Edmunds

Inventor:
Joseph A. Robbins
By Sylvenus Walker
Atty

UNITED STATES PATENT OFFICE.

JOSEPH A. ROBBINS, OF BOSTON, ASSIGNOR, BY MESNE ASSIGNMENTS, TO JOHN WEBSTER, OF SALEM, MASSACHUSETTS.

IMPROVEMENT IN PLANING-SAWS.

Specification forming part of Letters Patent No. 211,259, dated January 7, 1879; application filed March 28, 1878.

*To all whom it may concern:*

Be it known that I, JOSEPH A. ROBBINS, of Boston, in the county of Suffolk and State of Massachusetts, have invented certain new and useful Improvements in Planing-Saws, of which the following is a specification:

The object of my invention is to provide a cheap, simple, and efficient device to plane or smooth lumber, or woods of all kinds, so as to leave a very smooth, true, and even surface, and finish the same in a very rapid manner.

The invention consists in grinding or concaving the sides of the disk or plate, gradually increasing from the teeth toward the center until near the bearing-surface of the collars, where it terminates more abruptly, leaving the saw-plate at the center or surrounding the eye the same thickness as the edge, thus leaving that portion clamped between the collars when in use with parallel sides, instead of being ground, as heretofore, toward the center until the hole or eye is reached, which causes the saw to spring or deflect, so as to cut irregularly and bind.

Figure 1:
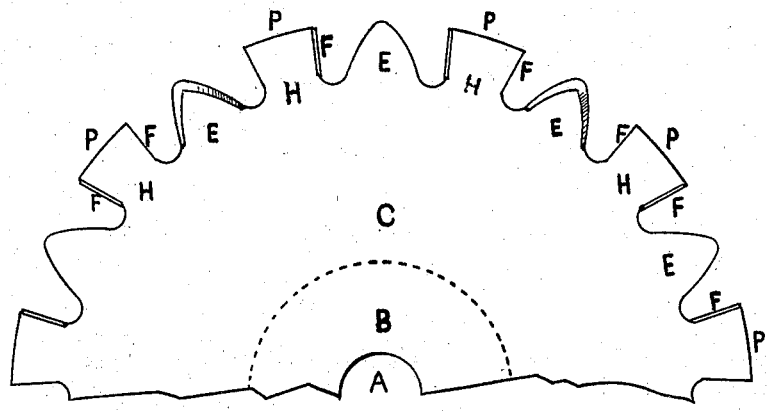
Figure 2:
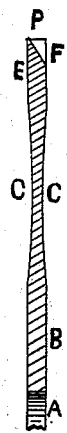
Figure 3:

Figure 1 is a view of a side elevation of a portion of a circular planing-saw constructed according to my invention. Fig. 2 is a view of a vertical section of the same. Fig. 3 is an edge view of a portion of the teeth of the same.

A represents the center hole in the saw. B represents the portion of the saw-plate clamped between the collars. (Shown by the dotted line.) C represents the concave in each side of the disk or plate, as shown in Fig. 2. E E represent a series of fleam-teeth, formed on both edges alike, and beveled to the right and left alternately, as shown. H H represent the planing-projections, having cutting edges or faces F, formed on a straight line radiating from or near the center of the saw, and are slightly beveled, as shown in Fig. 3, their extreme ends P being on the same circle as the circumference or periphery of the saw; or the face P may be straight, so as to form nearly a right angle with their cutting faces or edges F.

The teeth E and planers or projections H being formed radially around the saw, and so as to cut the same when the saw is revolved in either direction, the cutting-faces are upon both edges of the teeth E and planers H relatively the same, being formed alternately, as shown in Fig. 1. By this means, when the saw or planer becomes dull or worn, so as to retard its cutting, it is only necessary to remove it from the arbor and reverse sides, which will bring the other or opposite cutting-edges into use, thereby saving time or facilitating the work being performed.

Having thus described my invention, what I claim is—

A circular-saw plate having the concave portion C extending from the teeth to the collar-line B, and leaving the central portion surrounding the eye A of uniform thickness, as described, and for the purposes set forth.

JOSEPH A. ROBBINS.

Witnesses:
SYLVENUS WALKER,
H. S. TALBOT.